United States Patent [19]

Carlsson et al.

[11] Patent Number: 5,279,660
[45] Date of Patent: Jan. 18, 1994

[54] USE OF VISCOSITY-ADJUSTING AGENT TO COUNTERACT VISCOSITY DECREASE UPON TEMPERATURE INCREASE OF A WATER-BASED SYSTEM

[75] Inventors: Anders Carlsson; Björn Lindman, both of Lund; Olle Stenberg, Lidingö, all of Sweden

[73] Assignee: Berol Nobel Stenungsund AB, Stenungsund, Sweden

[21] Appl. No.: 895,440

[22] Filed: Jun. 5, 1992

Related U.S. Application Data

[63] Continuation-in-part of Ser. No. 613,543, Nov. 26, 1990, abandoned.

[30] Foreign Application Priority Data

May 24, 1988 [SE] Sweden .................. 8801918

[51] Int. Cl.$^5$ .................. C09D 101/26; C09D 101/28; C09D 7/12
[52] U.S. Cl. .................. 106/197.1; 137/1; 137/79; 137/92
[58] Field of Search .................. 106/197.1; 137/1, 79, 137/92

[56] References Cited

U.S. PATENT DOCUMENTS

3,485,651 12/1969 Ganz .................. 106/197.1
3,931,069 1/1976 Lundin .................. 106/197.1

FOREIGN PATENT DOCUMENTS

1072413 2/1980 Canada .

OTHER PUBLICATIONS

Hawley, *Condensed Chemical Dictionary*, Van Nosrand Reinhold, N.Y., 1974, p. 189 (no month avail).

*Primary Examiner*—David Brunsman
*Attorney, Agent, or Firm*—Spencer, Frank & Schneider

[57] ABSTRACT

The invention relates to a method in a water-base system for at least partially avoiding an expected viscosity decrease or providing a viscosity increase upon a temperature increase, by using a system containing as viscosity-adjusting agents a nonionic cellulose ether in such an amount that the aqueous solution thereof has a viscosity of 10–10,000 cP, measured according to Brookfield LV, 12 rpm at 20° C., and an ionic surface-active compound in an amount of 1–30 mmol per liter of water.

15 Claims, No Drawings

USE OF VISCOSITY-ADJUSTING AGENT TO COUNTERACT VISCOSITY DECREASE UPON TEMPERATURE INCREASE OF A WATER-BASED SYSTEM

This application is a continuation-in-part of application Ser. No. 07/613,543, filed Nov. 26, 1990 now abandoned.

BACKGROUND OF THE INVENTION

1. Field of the Invention

The present invention relates to a method, in a water-base system, of at least partially avoiding an expected viscosity decrease or of providing a viscosity increase upon a temperature increase, by using a system containing as viscosity-adjusting agent a nonionic water-soluble cellulose ether and a water-soluble ionic surface-active compound.

2. Background of the Art

Water-soluble polymers in most cases give rise to a substantial viscosity increase when dissolved in water. A large number of water-base systems therefore contain polymers and viscosity-adjusting agents. Also small additions, e.g. below 1% by weight, may cause considerable changes in the viscosity of the aqueous solution and even give rise to gelation. The viscosity of an aqueous solution of a polymer generally is dependent on concentration and temperature. Normally, the viscosity increases upon an increase of the polymer concentration or upon a temperature drop. Examples of polymers exhibiting such a temperature dependence are sodium alginate, polyvinyl alcohol and tragacanth.

There are many types of gel-forming water-soluble polymers. In most of these polymers, gelation occurs upon a temperature drop. Some polymers exhibit in aqueous solution a so-called turbidity point or flocculation temperature, which means that the polymer precipitates when the temperature is raised above a critical temperature. Known examples of such polymers are nonionic cellulose ethers. The normal behaviour of nonionic cellulose ethers is that the viscosity is reduced when the temperature is increased above room temperature. The reduction continues until flocculation temperature is attained. At this temperature, the solution starts becoming turbid and if the concentration of the polymer is sufficiently high, a viscosity increase can be observed. The process is reversible.

Protein solutions are somewhat exceptional in respect of temperature dependence. They often exhibit irreversible processes depending on so-called denaturation of the proteins when the temperature is raised. This in turn may give rise to irreversible gelation upon a temperature increase.

Thus, it can be concluded that the viscosity of a polymer solution is reduced upon a temperature increase, although certain polymers exhibit a substantial viscosity increase at their flocculation temperatures.

In many applications it is desirable to have access to water-base polymer solutions which exhibit a smaller viscosity decrease upon a temperature increase than current polymers or even a maintained or increased viscosity before gelation (viscosity increase associated with phase separation) possibly occurs.

Such properties are valuable in ceramic processes when aqueous mixtures should be extruded and the product thereafter heated with unaltered geometry. To this end, a constant or an increasing viscosity with increasing temperature is needed in order that the structure of the extruded product should not collapse. This is also the case in several applications within the food industry where extrusion is often carried out with subsequent heating. In deep-frying, it may sometimes be desirable to increase the viscosity when the temperature is raised so as to reduce the penetration of frying-oil into the food product. Other fields of use are liquid compositions for therapeutic or cosmetic treatment of man and animal where it is desirable in many cases that the viscosity of the compositions be raised, possibly followed by gelation upon heating to body temperature. Further examples are found in suspension polymerisation when it is desirable to provide stabilisation of monomer-containing droplets at increased temperatures.

Canadian Patent Specification 1,072,413 discloses a method for preparing water-base polymer compositions which are liquid at room temperature, but lose their fluidity and form a gel upon a temperature increase. This is achieved by using a gel-forming component in the form of a special type of block polymer of ethylene oxide and propylene oxide, optionally in combination with a modifying polymer component.

SUMMARY OF THE INVENTION

It has now surprisingly been found that the expected viscosity decrease upon a temperature increase in a water-base polymer system containing a liquid phase of which at least 85% by weight is water, is considerably reduced and in many cases even changed into a viscosity increase by using a water-base polymer system the liquid phase of which contains as viscosity-adjusting agent:

a) a nonionic cellulose ether in such an amount that the aqueous solution thereof has a viscosity of 10–10,000 cP, preferably 30–5,000 cP, measured according to Brookfield LV, 12 rpm at 20° C., and b) a water-soluble ionic surface-active compound in an amount of 1–30 mmol, preferably 2–20 mmol per liter of water.

The system thus obtained exhibits a surprisingly advantageous viscosity behaviour upon a temperature increase. By adjusting the flocculation temperature of the cellulose ether and the amount of ionic surface-active compound, gels and gel-like structures can also be obtained. Especially advantageous are the properties of the system at low shear rates, such as shear rates of about $5\ s^{-1}$, preferably below $1\ s^1$. The content of the ionic surface-active compound is preferably selected so as to be of the same order of magnitude as the critical micelle-forming concentration, although evident viscosity-improving effects can be observed at a lower concentration. A suitable added amount of the ionic surface-active compound is about 0.2–5 times the critical micelle-forming concentration.

The ionic surface-active compounds may be both cationic and anionic micelle-forming compounds. Examples of suitable cationic compounds are quaternary ammonium compounds with at least one hydrocarbon group having 8–24 carbon atoms. Examples of suitable anionic surface-active compounds primarily are sulphates, such as ether sulphates and alkyl sulphates, with a hydrocarbon group having 8–24 carbon atoms, but also carboxylates, sulphonates, ether phosphates, phosphates and phosphonates with one or more hydrocarbon groups having 8–24 carbon atoms are advantageously used. The hydrocarbon groups may be both aliphatic and aromatic.

The cellulose ethers according to the invention should be water-soluble at the temperature at which the aqueous solution is prepared. They suitably have such a degree of polymerisation that a 1% aqueous solution thereof has a viscosity of 10-10,000 cP, preferably 30-5,000 cP, measured according to Brookfield LV, 12 rpm at 20° C. They may exhibit hydrophobic hydrocarbon groups, such as methyl, ethyl, propyl, butyl, benzyl and higher hydrocarbon groups having 8-24 carbon atoms or polar hydroxyl groups, such as hydroxyethyl, hydroxypropyl and hydroxybutyl, or mixtures of hydrocarbon groups and polar groups. The flocculation temperature of the cellulose ethers suitably is above room temperature and is adjusted to the field of use of the system. Examples of suitable cellulose ethers are methylcellulose, ethylcellulose, hydroxyethylcellulose, hydroxypropylcellulose, methylhydroxyethylcellulose, ethylhydroxypropylcellulose, ethylhydroxyethylcellulose and benzylethylhydroxyethylcellulose.

The present invention can be used at different pH values, although strongly basic and acid pH values should be avoided as well as high electrolyte contents,. The polymer system may advantageously be used as a coating to establish a barrier, e.g. for preventing dehydration. Components having therapeutic and cosmetic effects can also be incorporated in the system. It is also possible in the liquid phase to disperse solid and liquid materials, such as fillers and binders, e.g. in the production of ceramic materials and foodstuffs.

DESCRIPTION OF THE PREFERRED EMBODIMENTS

Example

Nonionic cellulose derivatives and ionic surface-active compounds are added to water in the amounts stated in the following Tables. The viscosity of the compositions was measured at different temperatures and different shear rates. The results appear from the Tables.

TABLE 1

List of substances used

| Code | Compound | Flocculation temperature °C. | Viscosity 1% solution 20° C. Brookfield LV, 12 rpm |
|---|---|---|---|
| A | Ethylhydroxyethyl-cellulose | 45 | 4800 |
| B | Ethylhydroxyethyl-cellulose | 38 | 34 |
| C | Hydroxypropyl-cellulose | 45 | 2500 |
| D | Hydroxyethylcellulose modified with $C_{14}$-alkyl groups | >100 | 175 |
| E | Ethylhydroxyethyl-cellulose | 73 | 4500 |
| F | Methylcellulose | 44 | 55 |
| CTAB | Cetyltrimethyl ammonium bromide | | |
| SDS | Sodium dodecylsulphate | | |

TABLE 2

Results

| Test | Additive Ether Surfactant | Conc. % by weight mmol | Viscosity 0.147 s$^{-1}$ | | | | | |
|---|---|---|---|---|---|---|---|---|
| | | | 20° C. | 30° C. | 40° C. | 50° C. | 60° C. | 70° C. |
| 1 | A | 1 | 9000 | 6700 | 4400 | 1900 | — | — |
| 2 | A<br>CTAB | 1<br>10 | 21000 | 24000 | 26000 | 34000 | 49000 | — |
| 3 | B | 1 | 300 | 400 | 700 | 500 | 100 | — |
| 4 | B<br>CTAB | 1<br>12 | 400 | 600 | 1600 | 6100 | — | 9100 |

TABLE 3

Results

| Test | Additive Ether Surfactant | Conc. % by weight mmol | Viscosity 0.0147 s$^{-1}$ | | | | | |
|---|---|---|---|---|---|---|---|---|
| | | | 20° C. | 30° C. | 40° C. | 50° C. | 60° C. | 70° C. |
| 5 | A | 1 | $1 \cdot 10^4$ | $2 \cdot 10^4$ | $2 \cdot 10^4$ | $2 \cdot 10^4$ | $4 \cdot 10^4$ | $1 \cdot 10^4$ |
| 6 | A<br>SDS | 1<br>5 | $15 \cdot 10^4$ | $20 \cdot 10^4$ | $25 \cdot 20^4$ | $40 \cdot 10^4$ | $50 \cdot 10^4$ | $50 \cdot 10^4$ |
| 7 | A<br>SDS | 1<br>10 | $20 \cdot 10^4$ | $30 \cdot 10^4$ | $40 \cdot 10^4$ | $50 \cdot 10^4$ | $50 \cdot 10^4$ | — |
| 8 | A<br>SDS | 0.5<br>5 | 5000 | 10000 | 15000 | 20000 | 30000 | 30000 |
| 9 | A<br>SDS | 0.5<br>10 | 3000 | 15000 | 9000 | 10000 | 20000 | 30000 |
| 10 | A<br>SDS | 0.25<br>10 | 300 | 2500 | 4000 | 6000 | 8000 | 10000 |
| 11 | D | 1 | 3000 | 4000 | 3000 | 300 | — | — |
| 12 | D<br>SDS | 1<br>5 | $3 \cdot 10^5$ | $2 \cdot 10^5$ | $2 \cdot 10^5$ | $2 \cdot 10^5$ | — | — |
| 13 | C | 1 | 3000 | 1500 | 500 | 8000 | 7000 | 8000 |
| 14 | C<br>SDS | 1<br>5 | $2 \cdot 10^5$ | $3 \cdot 10^5$ | $4 \cdot 10^5$ | $4 \cdot 10^5$ | $3 \cdot 10^5$ | $2 \cdot 10^5$ |
| 15 | E | 0.5 | 3500 | 4000 | 4000 | 4000 | 3000 | 1500 |
| 16 | E<br>SDS | 0.5<br>5 | 1200 | 3000 | 5000 | 7000 | 4000 | 11000 |

TABLE 4

| Test | Additive Ether Surfactant | Conc. % by weight mmol | Results Viscosity 1.47 s$^{-1}$ | | | | | |
|---|---|---|---|---|---|---|---|---|
| | | | 20° C. | 30° C. | 40° C. | 50° C. | 60° C. | 70° C. |
| 17 | A | 1 | 2200 | 1900 | 1400 | 900 | 600 | — |
| 18 | A<br>CTAB | 1<br>10 | 12000 | 14000 | 15000 | 21000 | 24000 | — |
| 19 | B | 1 | 60 | 60 | 90 | 30 | 20 | — |
| 20 | B<br>CTAB | 1<br>12 | 350 | 450 | 1500 | 5800 | 5800 | — |
| 21 | A<br>SDS | 1<br>5 | $2.5 \cdot 10^4$ | $2.5 \cdot 10^4$ | $3 \cdot 10^4$ | $2.5 \cdot 10^4$ | $2 \cdot 10^4$ | $1.5 \cdot 10^4$ |
| 22 | A<br>SDS | 1<br>10 | $4 \cdot 10^4$ | $6 \cdot 10^4$ | $4 \cdot 10^4$ | $3.5 \cdot 10^4$ | $3 \cdot 10^4$ | $2 \cdot 10^4$ |
| 23 | A | 0.5 | 400 | 200 | 50 | 70 | 30 | — |
| 24 | A<br>SDS | 0.5<br>5 | 1500 | 2100 | 3000 | 6000 | 5000 | 1600 |
| 25 | A<br>SDS | 0.5<br>10 | 1000 | 100 | 1300 | 160 | 300 | 500 |
| 26 | A<br>SDS | 0.25<br>10 | 20 | 300 | 600 | 900 | 1200 | 1500 |
| 27 | D | 1 | 250 | 150 | 100 | 60 | 30 | 40 |
| 28 | D<br>SDS | 1<br>5 | $3 \cdot 10^5$ | $2 \cdot 10^5$ | $2 \cdot 10^5$ | $2 \cdot 10^5$ | $2 \cdot 10^5$ | $2 \cdot 10^5$ |
| 29 | C | 1 | 1500 | 1200 | 800 | 30 | 70 | 100 |
| 30 | C<br>SDS | 1<br>5 | $2 \cdot 10^4$ | $2 \cdot 10^4$ | $1.5 \cdot 10^4$ | $1.5 \cdot 10^5$ | $1.5 \cdot 10^4$ | $3 \cdot 10^3$ |
| 31 | E | 0.5 | 500 | 300 | 2500 | 170 | 120 | 60 |
| 32 | E<br>SDS | 0.5<br>5 | 20 | 25 | 50 | 90 | 110 | 200 |
| 33 | F | 2 | $1.5 \cdot 10^3$ | $7 \cdot 10^2$ | $4 \cdot 10^2$ | $2 \cdot 10^2$ | — | — |
| 34 | F<br>SDS | 2<br>10 | $8 \cdot 10^3$ | $5 \cdot 10^3$ | $4 \cdot 10^3$ | $5 \cdot 10^3$ | — | — |

From the above results appears that water-base polymer systems containing as viscosity-adjusting agents both a nonionic cellulose ether and an ionic surface-active compound have a considerably improved viscosity evolution at raised temperatures than such systems as contain a nonionic cellulose ether alone.

What is claimed is:

1. The process of counteracting viscosity reduction in a water-based system, comprising:
   a. adding to a water-based system containing a liquid phase which is at least 85% by weight water a viscosity-adjusting agent consisting essentially of:
      (i) a cellulose ether which is nonionic and which is present in an amount effective to provide an aqueous solution thereof having a viscosity ranging from 10 to 10,000 cP, measured according to Brookfield LV, 12 rpm at 20° C., and
      (ii) an ionic compound which is surface-active and micelle-forming, and which is present in an amount ranging from 1 to 30 mmol per liter of water; and
   b. heating the water-based system containing the viscosity-adjusting agent to an increased temperature, whereby an anticipated viscosity reduction of the water-based system in response to the increased temperature is counteracted and is reduced or viscosity of the water-based system is increased.

2. The process as claimed in claim 1, wherein the cellulose ether is an alkylhydroxyalkylcellulose.

3. The process as claimed in claim 2, wherein the cellulose ether is present in an amount effective to provide an aqueous solution thereof having a viscosity ranging from 30 to 5,000 cP, measured according to Brookfield LV, 12 rpm at 20° C.

4. The process as claimed in claim 2, wherein the ionic compound is a sulfate having a hydrocarbon group having from 8 to 24 carbon atoms.

5. The process as claimed in claim 2, wherein the ionic compound is a quaternary ammonium compound having a hydrocarbon group having from 8 to 24 carbon atoms.

6. The process as claimed in claim 2, wherein the ionic compound is present in an amount ranging from 2 to 20 mmol per liter of water.

7. The process as claimed in claim 2, wherein the ionic compound has a critical micelle-forming concentration, and wherein the ionic compound is present in an amount ranging from 0.2 to 5 times its critical micelle-forming concentration.

8. The process as claimed in claim 1, wherein the cellulose ether is present in an amount effective to provide an aqueous solution thereof having a viscosity ranging from 30 to 5,000 cP, measured according to Brookfield LV, 12 rpm at 20° C.

9. The process as claimed in claim 1, wherein the ionic compound is a sulfate having a hydrocarbon group having from 8 to 24 carbon atoms.

10. The process as claimed in claim 1, wherein the ionic compound is a quaternary ammonium compound having a hydrocarbon group having from 8 to 24 carbon atoms.

11. The process as claimed in claim 1, wherein the ionic compound is present in an amount ranging from 2 to 20 mol per liter of water.

12. The process as claimed in claim 1, wherein the ionic compound has a critical micelle-forming concentration, and wherein the ionic compound is present in an amount ranging from 0.2 to 5 times its critical micelle-forming concentration.

13. The process according to claim 1, wherein the viscosity-adjusting agent is added in an amount effective to counteract the anticipated viscosity reduction of the water-based system.

14. The process of obtaining an improved viscosity in a water-based system, comprising:
   a. adding to a water-based system containing a liquid phase which is at least 85% by weight water a viscosity-adjusting agent consisting essentially of:
   (i) a cellulose ether which is nonionic and which is present in an amount effective to provide an aqueous solution thereof having a viscosity ranging from 10 to 10,000 cP, measured according to Brookfield LV, 12 rpm at 20° C., and
   (ii) an ionic compound which is surface-active and micelle-forming, and which is present in an amount ranging from 1 to 30 mmol per liter of water; and
   b. heating the water-based system containing the viscosity-adjusting agent to an increased temperature, whereby an anticipated viscosity reduction of the water-based system in response to the increased temperature is counteracted and is reduced or viscosity of the water-based system is increased.

15. The processing according to claim 14, wherein the viscosity-adjusting agent is added in an amount effective to counteract the anticipated viscosity reduction of the water-based system.

* * * * *